United States Patent
Umehara et al.

(10) Patent No.: US 6,246,475 B1
(45) Date of Patent: *Jun. 12, 2001

(54) MEASURING APPARATUS OF FLYING HEIGHT OF MAGNETIC HEAD

(75) Inventors: Motohiro Umehara; Masaki Sato, both of Shiga (JP)

(73) Assignee: Kyocera Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,846

(22) Filed: Dec. 19, 1997

(30) Foreign Application Priority Data

Dec. 20, 1996 (JP) .................................... 8-341701

(51) Int. Cl.⁷ ...................................................... G01B 9/02
(52) U.S. Cl. .............................................................. 356/357
(58) Field of Search ..................................... 356/445, 351, 356/369, 357, 358, 361, 243, 394, 373; 369/47, 50, 100, 110, 13; 430/56, 69, 84; 365/106; 436/60, 84; 428/704, 699, 700, 698

(56) References Cited

U.S. PATENT DOCUMENTS

| | | | | |
|---|---|---|---|---|
| 4,862,414 | * | 8/1989 | Kuchnle | 365/106 |
| 5,063,538 | * | 11/1991 | Kuchnle | 365/106 |
| 5,619,331 | * | 4/1997 | Li | 356/394 |
| 5,767,964 | * | 6/1998 | Wahl et al. | 356/243 |
| 5,781,299 | * | 7/1998 | Womack et al. | 356/357 |
| 5,818,658 | * | 10/1998 | Balster et al. | 360/75 |
| 5,831,733 | * | 11/1998 | De Groot | 356/369 |

\* cited by examiner

*Primary Examiner*—Frank G. Font
*Assistant Examiner*—Michael P. Stafira
(74) *Attorney, Agent, or Firm*—Hogan & Hartson, LLP

(57) ABSTRACT

An apparatus characterized by disposing a magnetic head 20 at one side of a transparent disk 10, and light emitting means 11 and light detecting means 12 at other side, for measuring the flying height h of the magnetic head 20 by detecting the reflected light 14 of the light emitted to the magnetic head 20 from the light emitting means 11 through the transparent disk 10, while rotating the transparent disk 10 disk and lifting the magnetic head 20, which is extended in the life of the transparent disk 10, reduced in weight, and free from adverse effects of static electricity if decreased in the flying height h of the magnetic head 20. The transparent disk 10 is formed of monocrystalline sapphire.

3 Claims, 3 Drawing Sheets

MEASURING APPARATUS OF FLYING HEIGHT OF MAGNETIC HEAD

BACKGROUND OF THE INVENTION

The present invention relates to an apparatus for measuring the flying height of a magnetic head used in a magnetic disk apparatus.

In a magnetic disk apparatus, a magnetic disk forming a magnetic film on a disk-shaped substrate is used as a recording medium, and a magnetic head for recording and reproducing is disposed on the magnetic disk. While being stopped, the magnetic head is contacting with the magnetic disk, but when the magnetic disk is rotated at high speed when driving, the magnetic head is lifted by a negative pressure generating groove provided in a slider of the magnetic head so as to be in a non-contact state, and recording or reading is done while keeping a small flying height. Recently, for high density recording, the flying height of the magnetic head is required to be as small as 100 nm or less.

When manufacturing such magnetic disk apparatus, it is necessary to measure preliminarily if the flying height of the magnetic head is a specified value or not, and a measuring apparatus of flying height of magnetic head is used for this purpose.

In this apparatus, as shown in FIG. 1, instead of the original magnetic disk, a transparent disk 10 made of glass or the like is used, a magnetic head 20 to be measured is disposed at one side of this transparent disk 10, and light emitting means 11 and light detecting means 12 are provided at other side. Usually, the magnetic head 20 contacts with the transparent disk 10, and is lifted when the transparent disk 10 is rotated at high speed, and in this state an exit light 13 is emitted from the light emitting means 11 toward the magnetic head 20 through the transparent disk 10, this exit light 13 is reflected on a principal plane 10a of the magnetic head 20 side of the transparent disk 10, and this reflected light 14a and reflected light 14b from the magnetic head 20 are received in the light detecting means 12, and by making use of the interference by phase difference of both reflected lights 14a, 14b, the flying height h of the magnetic head 20 is measured.

In such magnetic head flying height measuring apparatus, although the magnetic head 20 is lifted during rotation, when starting or stopping rotation, the magnetic head 20 contacts and slides with the transparent disk 10 Accordingly, the glass-made transparent disk 10 is worn out excessively due to sliding with the magnetic head 20, and by using for about a week, it is hard to read the reflected light 14 due to flaw, and hence it must be replaced. It is hence not only bothersome but is also inferior in reliability of measured value.

Yet, since the glass-made transparent disk 10 is low in stiffness, it is likely to be deformed when rotating at high speed, and hence it was hard to form thinly to reduced weight.

Still more, by using the glass-made transparent disk 10, when the flying height h of the magnetic head 20 is reduced to scores of nm, the transparent disk 10 is charged with static electricity, and adverse effects are caused on the magnetic head 20. In particular, as the magnetic head 20 is advanced in density, it is changed from the ID (inductive) head to the MR (magnetic resistance) head, and this MR head is weak in static electricity, and is damaged by static electricity when the flying height h is 20 to 40 nm.

SUMMARY OF THE PREFERRED EMBODIMENTS

It is hence a feature of the invention that the transparent disk made of a transparent material is formed of a monocrystalline sapphire in the apparatus for measuring the flying height of the magnetic head by make use of interference of light.

It is also feature of the invention that the principal plane of the transparent disk coincides with C-plan.

According to the invention, since the transparent disk is formed of monocrystalline sapphire of high hardness, it is resistant to scratches by sliding with the magnetic head, and it can be used for a long period. Besides, since the monocrystalline sapphire is high in stiffness, it is hardly deformed in high speed rotation, so that the transparent disk may be thin and lightweight. Morever, as the flying height of the magnetic head is smaller, light of shorter wavelength is needed, but the monocrystalline sapphire shows a sufficient permeability to the light of short wavelength.

Further, when the principal plane of the transparent disk coincides with C-plane of the monocrystalline sapphire, the flying height can be measured accurately by eliminating the effects of birefringence.

EMBODIMENTS

Figure 1A:
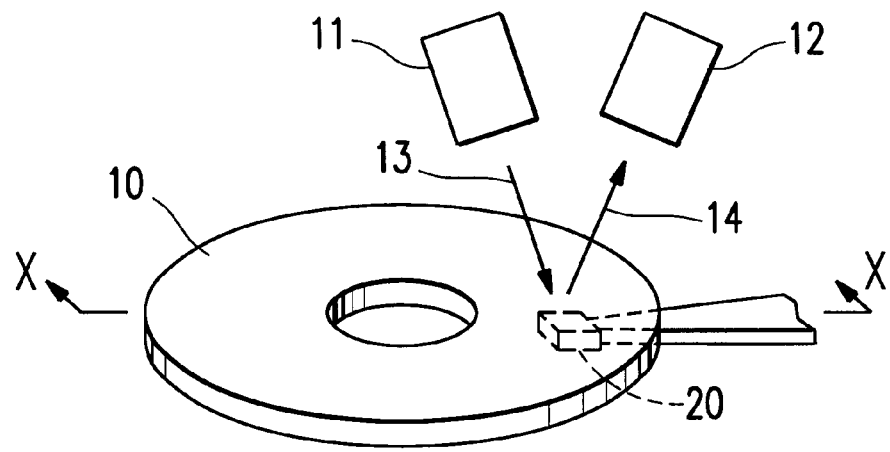
FIG. 1a and 1b shows a schematic structure of a magnetic head flying heitht measuring apparatus, in which (a) is a perspective view, and (b) is a sectional view along line X—X in (a).

Referring now to the drawings, embodiments of the invention are described below.

Figure 1B:
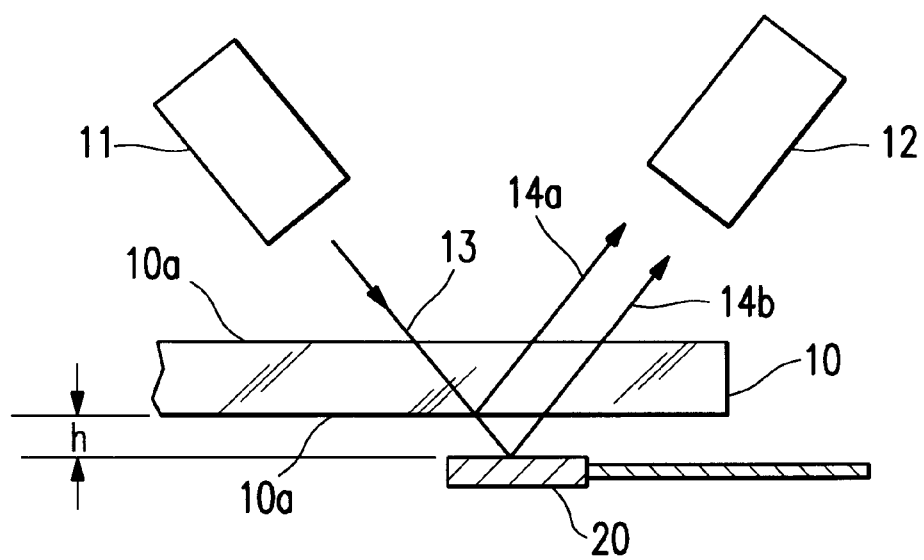

In the magnetic head flying height measuring apparatus shown in FIG. 1, instead of the original magnetic disk, a transparent disk 10 is used, a magnetic head 20 is disposed at one side of this transparent disk 10, and light emitting means 11 and light detecting means 12 are provided at other side. Usually, the magnetic head 20 contacts with the transparent disk 10, but is lifted when the magnetic disk 10 is rotated at high speed, around 10,000 rpm, and in this state an exit light 13 is emitted from the light emitting means 11, this exit light 13 is reflected on a principal plane 10a of the magnetic head 20 side of the transparent disk 10, and this reflected light 14a and reflected light 14b from the magnetic head 20 are received in the light detecting means 12, and by making use of the interference of both reflected lights 14a, 14b, the flying height h of the magnetic head 20 is measured.

Figure 2:
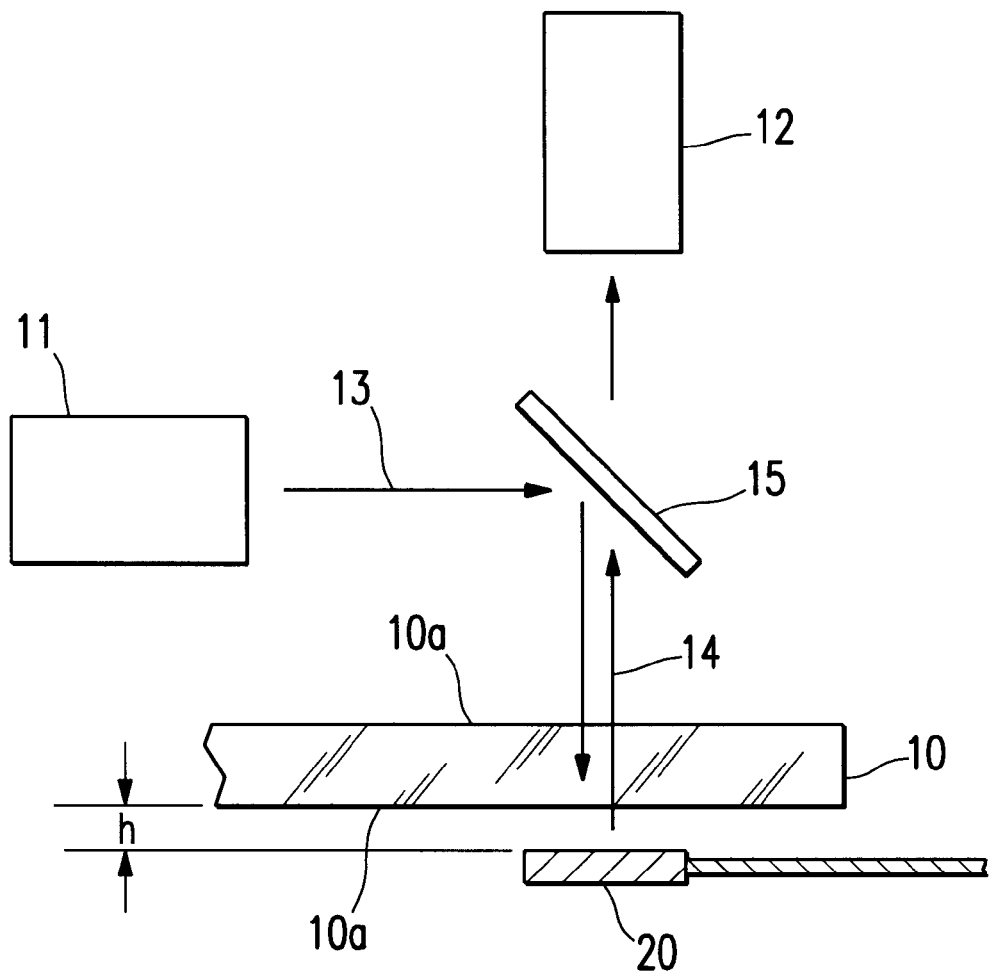
FIG. 2 is a sectional view shoving other embodiment of a magnetic head flying height measuring apparatus.

In FIG. 1, incidentally, the light is emitted in an oblique direction, but as shown in FIG. 2, the exit light 13 and reflected light 14 may be set oppositely in a same direction by using a beam splitter 15.

In the invention, the transparent disk 10 is formed of monocrystalline sapphire. Herein, the monocrystalline sapphire is a single crystal of alumina ($Al_2O_3$), and this is a material extremely high in hardness and stiffness and excellent in light permeability, as shown in the characteristics compared with ordinary glass materials in Table 1 (white sheet glass BK-7, quartz glass).

Accordingly, when the transparent disk 10 made of monocrystalline sapphire is used, it is hardly scratched by sliding with the magnetic head 20 when starting or stopping rotation, and the resistance to chemicals and others is also excellent, so that it can be used favorable for a long period. Still more, since the rigidity is high, it is hardly deformed when rotating at high speed, so that it can be formed thinly to be reduced in weight.

To exhibit the effect, meanwhile, it is preferred to use, for forming the transparent disk 10, the monocrystalline sapphire of which $Al_2O_3$ content is 99.99 wt. % or more, Vickers hardness is 2000 kg/mm$^2$ or more, and Young modulus of $4 \times 10^{11}$ kg/mm$^2$ or more.

Besides, the transparent disk 10 made of monocrystalline sapphire is excellent in surface precision, free from defect, and non-magnetic, and hence it hardly causes adverse effects on the magnetic head 20.

TABLE 1

| Characteristic | Monocrystalline sapphire | White sheet glass (BK-1) | Quartz glass |
| --- | --- | --- | --- |
| Vickers hardness (kg/mm$^2$) | 2300 | 570 | 900 |
| Young's modulus (kg/mm$^2$) | 48000 | 7300 | 7400 |
| Flexural strength (kg/mm$^2$) | 70 | 60 | 68 |
| Coefficient or thermal expansion ($\times 10^{-6}$/° C.) | 7.7 | 9.8 | 0.54 |
| Resistance to chemicals | ⊚ | X | ○ |
| Heat resistant temperature (° C.) | 2053 | 870 | 1730 |
| Specific gravity (g/cm$^3$) | 3.97 | 2.52 | 2.20 |

In this magnetic head flying height measuring apparatus, the smaller the flying height h of the magnetic head 20, the light of shorter wavelength is required for measuring, and the transparent disk 10 made of monocrystalline sapphire is excellent in transmission of light of shorter wavelength.

Figure 3:
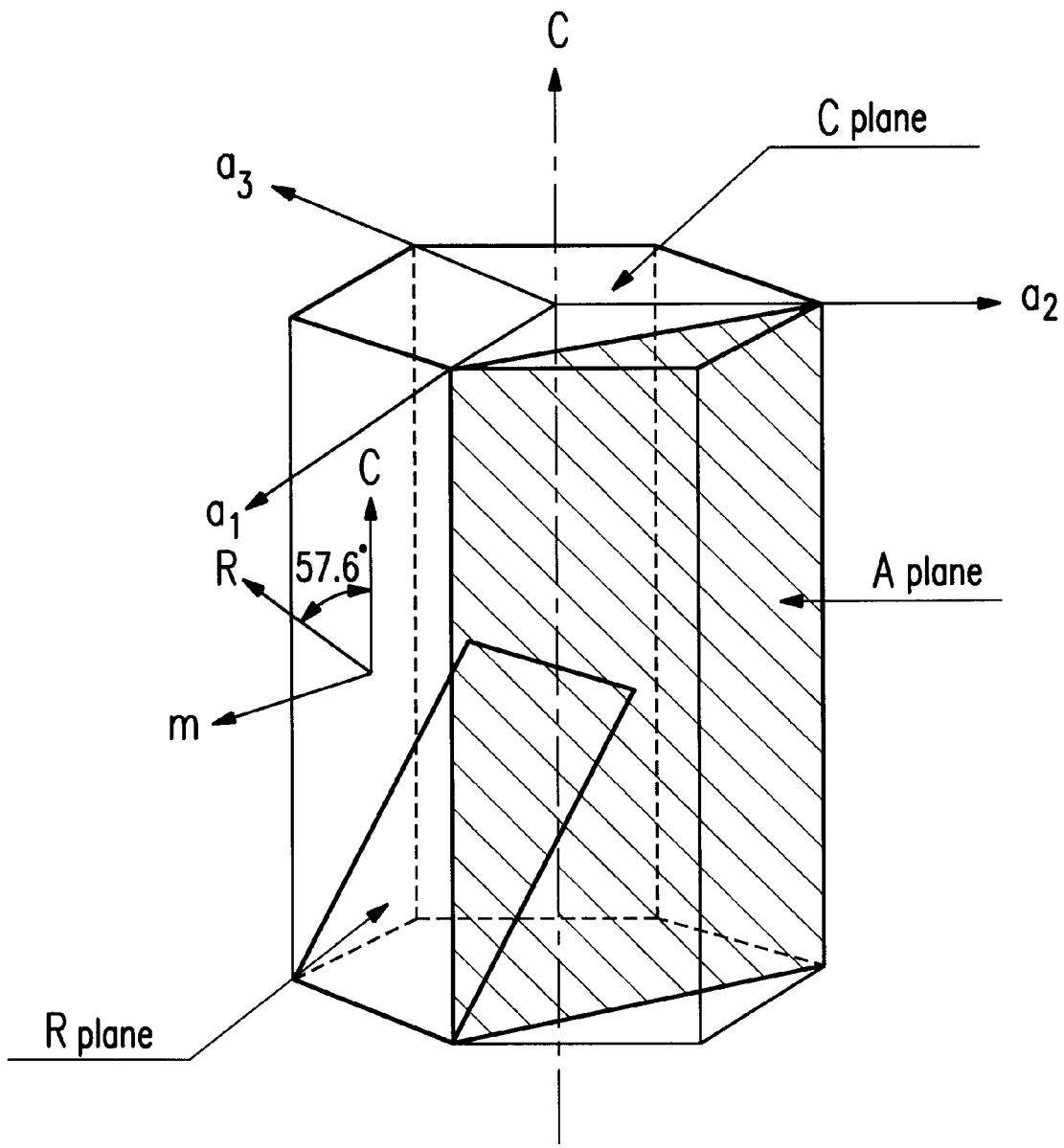
FIG. 3 is a diagram showing crystal orientation of monocrystalline sapphire.

The monocrystalline sapphire exists in various forms as shown in FIG. 3, including single crystals of C-axis, A-axis, R-axis, etc., and various crystal orientations such as C-plane, A-plane, R-plane, etc. vertical to each crystal axis, and in this transparent disk 10, the principal plane 10a coincides with C-plane. Herein, coincidence with C-plane means that the principal plane 10a is C-plane $(0001) \pm 2°$, which hence prevents birefringence of exit light 13 and reflected light 14.

That is, the refractive index No of monocrystalline sapphire to oridinary ray and refractive index Ne to extra oridinary ray are No=1.768

Ne=1.760 and as a result of various experiments, the light entering vertically C-plane of the monocrystalline sapphire is a normal light with refractive index of No, but the light entering a plane vertical to C-Plane is an abnormal light with refractive index of Ne, and it is discovered that a birefringence is caused by the difference from the refractive index No. Accordingly, if the principal plane 10a of the transparent disk 10 is other than C-plane, a deviation from the normal optical path occurs due to such birefringence, which results in a measuring error. By contrast, with the principal plane 10a of the transparent disk 10 coincides with C-plane, there is no birefringence, so that accurate measurement is possible.

For accurate measurement, moreover, the principal plane 10a is preferred to have a smooth surface with surface roughness (central line mean roughness Ra) of 0.01 $\mu$m or less, and flatness of 5 $\mu$m or less, and the roundness of the outer circumference of the transparent disk 10 is preferred to be 20 $\mu$m or less.

Moreover, by using the transparent disk 10 made of monocrystalline sapphire, charging with static electricity occurring when the flying height h of the magnetic head 20 is reduced can be prevented. This reason is not clear, but may be estimated as follows. That is, when the transparent disk 10 rotates at high speed with the magnetic head 20 lifted slightly, it is considered that static electricity is generated on the surface of the transparent disk 10 due to friction of air. At this time, since the monocrystalline sapphire itself is a material hard to generate static electricity as compared with glass, and the ultra-microstructure of the surface of transparent disk 10 disclose more very small asperities on the monocrystalline sapphire than on the glass, which is considered why static electricity is hardly generated.

Such transparent disk 10 made of monocrystalline sapphire can be manufactured by lifting up seed crystals from molten alumina by EFG or other method. At this time, by adjusting the die shape and crystal orientation of seed crystals, it is lifted in a plate form so that the principal plane may be C-plane, and processed into a disk, and polished on the surface, so that the transparent disk 10 of the invention may be obtained.

In the magnetic head flying height measuring apparatus shown in FIG. 1 and FIG. 2, the visible ray or ultraviolet ray is used as the exit light 13, the light emitting means 11 is composed of light source, and mirror or lens, and the light source is mercury arc lamp or halogen lamp. Further, plural types of exit light 13 can be used, and, for example, three primary spectral lines of three colors, yellow (wavelength 580 nm), green (wavelength 546 nm), and blue (wavelength 436 nm), can be emitted simultaneously, and the interference fringes can be measured by the light detecting means 12.

On the other hand, the light detecting means 12 may be composed of TV camera for detecting the image, spectral radiation meter, computer for analyzing data, and others.

Such magnetic head flying height measuring apparatus of the invention may be used preferably in measurement of tiny flying height, especially the lift h of the magnetic head 20 of 100 nm or less.

In an embodiment of the invention, a transparent disk 10 shown in FIG. 1 was fabricated of monocrystalline sapphire, and processed into a diameter of 76.2 mm (3 inches), and a thickness of 1.8 mm. On the other hand, as comparative examples, transparent disks 10 of same dimensions were made of white sheet glass (BK-7) and quartz glass.

As the magnetic head flying height measuring apparatus shown in FIG. 1, preparing the light emitting means 11 by using laser beam and the magnetic head 20 by using MR head, the transparent disks 10 were incorporated and tested.

First, rotating the transparent disk 10 at 12,000 rpm, the flying height h of the magnetic head 20 was varied, and presence or absence of damage of the magnetic head 20 by static electricity was investigated. The results are shown in Table 2, in which when the flying height h of the magnetic head 20 was 40 nm or less, the transparent disks 10 made of glass in comparative examples were damaged by static electricity. By contrast, in the embodiment of the invention using the transparent disk 10 of monocrystalline sapphire, there was no damage by static electricity at all.

TABLE 2

| Lift of magnetic head (nm) | Embodiment Monocrystalline sapphire | Comparative examples White sheet glass (BK-7) | Quartz glass |
| --- | --- | --- | --- |
| 100 | ◯ | ◯ | ◯ |
| 40 | ◯ | X | X |
| 20 | ◯ | X | X |

Still more, using the same types of transparent disk 10 as above, the duration until onset of reading failure due to damage of transparent disk 10 was investigated. As shown in Table 3, the comparative examples were unusable in a week, whereas the embodiment of the invention was still usable after six months, and the life could be extended notably.

TABLE 3

| | Embodiment Monocrystalline sapphire | Comparative examples White sheet glass (BK-7) | Quartz glass |
| --- | --- | --- | --- |
| Usable period | No problem in 6 months | Replaced in 1 week | Replaced in 1 week |

Thus, according to the invention, by disposing a magnetic head at one side of a transparent disk, and light emitting means and light detecting means at other side, in the apparatus designed to measure the flying height of the magnetic head by detecting the reflected light of the light emitted from the light emitting means through the transparent disk, while rotating the transparent disk and lifting the magnetic head, the transparent disk is formed of monocrystalline sapphire, and thereby the life of the transparent disk can be extended, the weight can be reduced, the flying height of the magnetic head is reduced, and adverse effects of static electricity can be prevented.

Moreover, since the principal plane of the transparent disk is designed to coincide with C-plane, occurrence of error by birefringence is prevented, and it is possible to measure at an extremely high precision.

What is claimed is:

1. Apparatus for measuring flying height of a magnetic head characterized by a magnetic head disposed at one side of a transparent disk of monocrystalline sapphire with a principal plane of the disk coinciding with a C-plane of said sapphire, and light emitting and light detecting means at another side of the transparent disk for measuring flying height of the magnetic head by detecting a path length light reflected by the magnetic head after leaving the light emitting means and passing through the transparent disk while rotating the transparent disk and lifting the magnetic head, wherein polarized light is not used to determine the path length.

2. Apparatus for measuring flying height of a magnetic head according to claim 1, wherein the principal plane of the magnetic disk has a surface roughness (central line mean roughness Ra) of 0.01 micron or less, and a flatness of 5 microns or less.

3. Apparatus for measuring flying height of a magnetic head according to claim 1, wherein the lift of the magnetic head is 100 nm or less.

* * * * *